(12) United States Patent
Sakata

(10) Patent No.: US 9,682,673 B2
(45) Date of Patent: Jun. 20, 2017

(54) VEHICLE POWER SOURCE DEVICE AND VEHICLE EQUIPPED WITH THE POWER SOURCE DEVICE

(71) Applicant: Sanyo Electric Co., LTD., Osaka (JP)

(72) Inventor: Hideki Sakata, Hyogo (JP)

(73) Assignee: SANYO ELECTRIC CO., LTD., Osaka (JP)

(*) Notice: Subject to any disclaimer, the term of this patent is extended or adjusted under 35 U.S.C. 154(b) by 428 days.

(21) Appl. No.: 14/382,778

(22) PCT Filed: Mar. 18, 2013

(86) PCT No.: PCT/JP2013/057619
§ 371 (c)(1),
(2) Date: Sep. 4, 2014

(87) PCT Pub. No.: WO2013/141196
PCT Pub. Date: Sep. 26, 2013

(65) Prior Publication Data
US 2015/0035356 A1    Feb. 5, 2015

(30) Foreign Application Priority Data
Mar. 23, 2012 (JP) .............................. 2012-068403

(51) Int. Cl.
*B60R 16/033* (2006.01)
*H02J 7/16* (2006.01)
(Continued)

(52) U.S. Cl.
CPC .......... *B60R 16/033* (2013.01); *H02J 7/1423* (2013.01); *H02J 7/1461* (2013.01);
(Continued)

(58) Field of Classification Search
CPC .......... B60R 16/02; B60R 16/033; B62D 5/04; B62D 6/00; B62D 113/00; B62D 119/00
(Continued)

(56) References Cited

U.S. PATENT DOCUMENTS 6,278,919 B1   8/2001 Hwang et al.
2007/0032915 A1   2/2007 Yamaguchi
(Continued)

FOREIGN PATENT DOCUMENTS

JP   2002-533270   10/2002
JP   2003-175782   6/2003
(Continued)

OTHER PUBLICATIONS

Translation of JP 2008302825.*
International Search Report issued Jun. 11, 2013 in International (PCT) Application No. PCT/JP2013/057619.

*Primary Examiner* — Rexford Barnie
*Assistant Examiner* — Elim Ortiz
(74) *Attorney, Agent, or Firm* — Wenderoth, Lind & Ponack, L.L.P.

(57) ABSTRACT

A vehicle power supply device comprises a first battery connectable to a starter motor, a vehicle load, and a generator, a second battery different from the first battery in electric characteristics, a connecting switch connected between the first and second batteries, and connecting the first and second batteries in parallel in an ON state of the connecting switch, and a control circuit controlling the connecting switch. In the ON state of the connecting switch, the generator charges the first and second batteries. The control circuit controls to change to the OFF state of the connecting switch in a state of providing electric power to the starter motor, or in a state of detecting an open condition including an abnormal state of the first battery and/or the
(Continued)

second battery, and to hold the connecting switch in the ON state in a normal state in which the open condition is not detected.

9 Claims, 1 Drawing Sheet

(51) Int. Cl.
*H02J 7/14* (2006.01)
*H01M 10/42* (2006.01)
*H01M 16/00* (2006.01)

(52) U.S. Cl.
CPC ........... *H02J 7/16* (2013.01); *H01M 10/4207* (2013.01); *H01M 16/00* (2013.01); *H01M 2220/20* (2013.01)

(58) Field of Classification Search
USPC .......................................................... 307/9.1
See application file for complete search history.

(56) References Cited

U.S. PATENT DOCUMENTS

| | | | |
|---|---|---|---|
| 2009/0230766 A1* | 9/2009 | Miyama | H02J 7/1423 307/10.7 |
| 2011/0001352 A1 | 1/2011 | Tamura et al. | |
| 2011/0320109 A1* | 12/2011 | Polimeno | B60L 3/0092 701/113 |
| 2013/0063154 A1* | 3/2013 | Nakajima | B60L 3/0046 324/550 |
| 2014/0091767 A1 | 4/2014 | Tamura et al. | |

FOREIGN PATENT DOCUMENTS

| | | |
|---|---|---|
| JP | 2003-226207 | 8/2003 |
| JP | 2007-064209 | 3/2007 |
| JP | 2008-302825 | 12/2008 |
| JP | 2008302825 A * | 12/2008 |
| JP | 2009-214839 | 9/2009 |
| JP | 2011-015516 | 1/2011 |
| JP | 2011-246114 | 12/2011 |

* cited by examiner

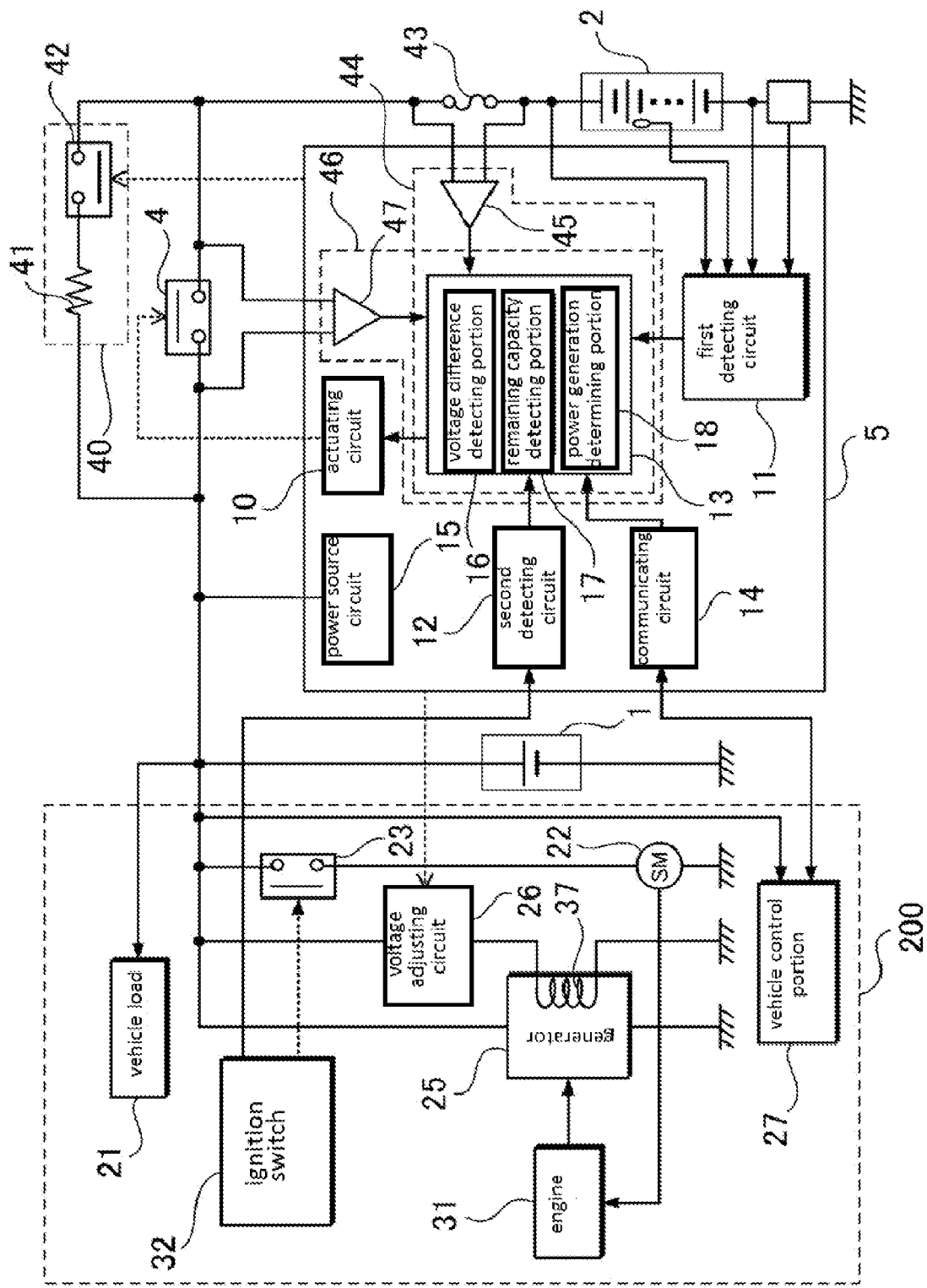

VEHICLE POWER SOURCE DEVICE AND VEHICLE EQUIPPED WITH THE POWER SOURCE DEVICE

TECHNICAL FIELD

The present invention is related to a vehicle power source device which provides electric power to a starter motor or electric devices installed on the vehicle, and a vehicle equipped with the power supply device.

BACKGROUND ART

A vehicle power source device in the following is developed. In the vehicle power source device, plural batteries which are different in the electric characteristics, for example, a lead batter and a lithium ion battery are connected in parallel, then the lithium ion battery has a higher energy density than the lead batter. (see patent literature 1)

In the power source device of patent literature 1, the lead batter is connected to the lithium ion battery as a high energy density battery. In this power source device, without via a DC/DC converter, the lead battery and the lithium ion battery are connected in parallel. In this power source, both the lead battery and the lithium ion battery are charged by a generator, and also provide electric power to a vehicle side load. In addition, the above power source device enables to get the excellent electric characteristics which one of them cannot get by the parallel connection of the lead battery and the lithium ion battery which are different in the electric characteristics. For example, the lead battery is inexpensive, and its charge and discharge capacity is large, and enables excellent large discharge current characteristics. For example, the lithium ion battery has a high capacity compared with weigh or volume, and is efficiently charged with a large current from a generator. Therefore, the power source device of the parallel connection of the lead battery and the lithium ion battery which are different in the electric characteristics enables the excellent characteristics which only the lead battery cannot enable.

CITATION LIST

Patent Literature

Patent Literature 1:
Japanese Laid-Open Patent Publication No. 2011-15516

SUMMARY OF THE INVENTION

Further, in the above power supply device the lead battery is connected to the vehicle side load, the generator, and the starter motor, the lithium ion battery is connected to the lead battery via a switch of a switching circuit. In this power supply device, the switch is controlled, then the lithium ion battery is connected to the lead battery. In order to charge or discharge the lithium ion battery while protecting the lithium ion battery, namely, only in the range of avoiding over charge or over discharge, the switch is in the ON state. Thus, normally, the switch is in the OFF state. Namely, the switch is connected in the normal OFF state. Therefore, this power supply device controls the switch in the state of normal OFF. This power supply device can charges or discharges with the switch being OFF while protecting the lithium ion battery. However, in the OFF state of the switch, as the lithium ion battery is not connected to the lead battery, only the lead battery is charged, and the lead battery and the lithium ion battery each discharge to different loads. As a result, a voltage difference occurs. When there is the voltage difference between the lead battery and the lithium ion battery, the switch can be damaged by the large current caused by turning on the switch. Especially, as the lead battery and the lithium ion battery have a low internal resistance so as to be efficiently charged by the generator, a large current flows by even the small voltage difference, and the switch can be damaged by the large current.

The present disclosure is developed for the purpose of solving such drawbacks. One non-limiting and explanatory embodiment provides a vehicle power source device and a vehicle equipped with the power supply device in which by connected plural batteries different in the electric characteristics, those are efficiently charged by using a generator, and by decreasing the voltage difference of the connected batteries in parallel, it prevents the life of the switch from decreasing.

A vehicle power supply device of the present disclosure comprises a first battery being connectable to a starter motor of a vehicle, a vehicle load, and a generator, a second battery being different from the first battery in the electric characteristics, a connecting switch being connected between the first battery and the second battery, and connecting the second battery to the first battery in parallel in a ON state of the connecting switch, and a control circuit controlling the connecting switch, and in the ON state of the connecting switch, the generator charges the first battery and the second battery. In the vehicle power supply device, the control circuit controls to change to the OFF state of the connecting switch in a state of providing electric power to the starter motor, or in a state of detecting an open condition including an abnormal state of the first battery and/or the second battery, and to hold the connecting switch in the ON state in a normal state in which the open condition is not detected.

In the above power supply device, by connected plural batteries different in the electric characteristics, those are efficiently charged by using a generator, and by decreasing the voltage difference of the connected batteries in parallel, it prevents the life of the switch from decreasing. Its reason in the above power supply device is in the following. Only in the state of detecting the open condition, the connecting switch is in the OFF state. Therefore, the connecting switch is held in the ON state in the normal state, accordingly the OFF state of the connecting switch is limited into specific conditions. The reason why the above power supply device is efficiently charged by using a generator is in the following. By connecting the second battery to the first battery in parallel through the connecting switch in the normal ON state at the normal usage condition, the battery capacity (Ah) becomes large. The large capacity batteries are not over charged by a large electric power of regenerative braking, and efficiently charged by a large electric power of regenerative braking, then it enables the electric energy stored in the batteries to be large. Namely the electric energy outputted from the generator can be efficiently stored in the batteries. In contrast, as the batteries of a small capacity (Ah) tends to be over charged by a large electric power of regenerative braking, charging is restricted, or as by the battery voltage increasing a charging current becomes small, it is difficult that the electric energy outputted from the generator is efficiently stored in the batteries. In addition, in the above power supply device by the connecting switch being in the normal ON state, the first battery and the second battery are almost always connected, and the second battery is rarely disconnected from the first battery. So the time length when the voltage difference of both batteries occurs by disconnecting the second battery from the first battery is short, then the voltage difference between the first battery and the second battery can be small. As in the state of a small voltage difference between the first battery and the second battery the connecting switch is turned on, the decrease of the life of the connecting switch is prevented by preventing a large rush current flowing through the connecting switch, reducing a damage of the switch.

In the vehicle power supply device of the present disclosure, the control circuit 5 comprises a voltage difference detecting portion 16 to detect a voltage difference between the first battery 1 and the second battery 2, and in the OFF state of the connecting switch 4, when the voltage difference detecting portion 16 detects the voltage difference more than the predetermined value, regarding as the open condition, the control circuit 5 holds the connecting switch in the OFF state.

In the above power supply device, when the voltage difference detecting portion 16 detects the voltage difference more than the predetermined value, the connecting switch is not turned on. So it does not occur that the connecting switch is turned on in the high voltage difference and a large current flows. Therefore, by an excessive large current of turning on the connecting switch, it effectively prevents the connecting switch from contacts being melted and joined together.

In the vehicle power supply device of the present disclosure, the control circuit comprises a communicating circuit connectable to a vehicle side, and when a voltage of the first battery inputted from the vehicle side via the communicating circuit is out of the normal range, regarding as the open condition, the control circuit changes to the OFF state of the connecting switch.

In the above power supply device, as the voltage of the first battery is inputted from the vehicle side via the communicating circuit 14, it is not necessary to set an electric circuit detecting the voltage of the first battery, and a circuit structure can be simple. As when the voltage of the first battery is out of the normal range regarding as the open condition the connecting switch is turned off, the second battery is charged and discharged while protecting the abnormal voltage from the second battery.

In the vehicle power supply device of the present disclosure, the control circuit comprises a remaining capacity detecting portion detecting a remaining capacity of the second battery, and a power generation determining portion determining a generating state or a non-generating state in the vehicle side, and when the remaining capacity detected in the remaining capacity detecting portion is more than a maxim remaining capacity and the power generation determining portion determines that the vehicle side is in the generating state, or when the remaining capacity detected in the remaining capacity detecting portion is less than a minimum remaining capacity and the power generation determining portion determines that the vehicle side is in the non-generating state, the control circuit holds the connecting switch in the OFF state, regarding as the open condition.

In the above power supply device, while preventing the second battery from the over charge or the over discharge, the second battery connected to the first battery is charged and discharged. Especially, as by controlling the connecting switch the second battery of the maxim remaining capacity is discharge and the second battery of the minimum remaining capacity is charged, the second battery is charged and discharged while controlling its remaining capacity within a preferable range.

The vehicle power supply device of the present disclosure comprises a fuse connected to the second battery in series, and a disconnection detecting portion detecting a disconnection of the fuse, and the disconnection detecting portion determines the disconnection by detecting a voltage between both ends of the fuse.

In the above power supply device, in both of the ON state and the OFF state of the connecting switch, the disconnection of the fuse can be determined. Its reason is in the following. In a state of the disconnection of the fuse, the voltage between both ends of the fuse becomes high, and in a state of the non-disconnection of the fuse, the voltage between both ends of the fuse is approximately 0V.

The vehicle power supply device of the present disclosure comprises a melt determining portion determining if contacts of the connecting switch are melted and joined together, and the melt determining portion determines the contacts being melted and joined together by detecting a voltage between both ends of the connecting switch.

In the above power supply device, the contacts being melted and joined together is surely determined. Its reason is in the following. At the time of the connecting switch being melted and joined together in the OFF state of the connecting switch, the voltage between both ends of the connecting switch becomes approximately 0V. At the time of the connecting switch being not melted and joined together in the OFF state of the connecting switch, the voltage between both ends of the connecting switch becomes high.

In the vehicle power supply device of the present disclosure, the first battery is a lead battery, and the second battery has a higher energy density than the first battery.

In the above power supply device, as the second battery has the higher energy density, the charging and discharging capacity compared with weigh or volume of all battery becomes large. And it is efficiently charged with a generating power from a generator, and is efficiently discharged. By enlarging the charging and discharging capacity with weight-saving and downsizing in all battery, in the vehicle with charging through a generation by regenerative braking or with an idle stop function, a fuel efficiency of the vehicle is improved. Its reason is in the following. As a charging amount through electric energy by regenerative braking becomes large, an engine stars by the charged battery. When the battery is not charged enough by regenerative braking, the battery is charged by the generator driven by the engine in order to start the engine. And the battery need be charged by the generator driven by the engine in order to provide electric power to a vehicle load. The fuel efficiency of the vehicle decreases, while doing the idle stop function.

In the vehicle power supply device of the present disclosure, the second battery having the high energy density is at least one of a nickel hydride battery, a lithium ion battery, or a lithium polymer battery.

In the above power supply device in which the first battery is the lead battery and the second battery is the nickel hydride battery, as the voltage characteristics of those are similar each other, while preventing the nickel hydride battery from over charge, the first battery and the second battery is effectively charged. Its reason is in the following. By controlling an output voltage of the generator in the vehicle side to prevent the lead battery as the first batter from over charge, it also prevent the second battery from over charge. In the power supply device in which the second battery is the lithium ion battery, or the lithium polymer battery, it enables the charging and discharging capacity of all battery to be large, while the second battery is compact and weight-saving.

The vehicle power supply device of the present disclosure comprises an equalizing circuit being connected to the connecting switch in parallel, and the equalizing circuit comprises a series circuit of a current limiting resistance and an equalizing switch, and in the OFF state of the connecting switch, the control circuit equalizes voltages of the first battery and the second battery by controlling the equalizing switch of the equalizing circuit.

In the above power supply device, as the control circuit equalizes voltages of the first battery and the second battery and the connecting switch is turns on, even though there is a voltage difference between, at the time of turning on the connecting switch the excessive rush current can be small, and the damage of the connecting switch by the rush current can be prevented.

The vehicle of the present disclosure is equipped with any one of the above power supply devices as an auxiliary battery in which the first battery and the second battery are connected in parallel via the connecting switch controlled in the normal ON state.

BRIEF DESCRIPTION OF DRAWINGS

FIG. 1 is a block diagram showing a structure of a vehicle power supply device according to an embodiment of the present disclosure.

DESCRIPTION OF EMBODIMENTS

Embodiments of the present invention will be described below based on the drawings. Note, however, that the embodiments shown below exemplify a vehicle power source device and a vehicle equipped with the power supply device for embodying the technical idea of the present invention, and the present invention does not specify a vehicle power source device and a vehicle equipped with the power supply device to those shown below. In particular, it does not mean that the members shown in the claims are specified to the members in the embodiments.

In a vehicle power supply device shown in FIG. 1, a generator 25 driven by regenerative braking, and an idle stop function are installed in a vehicle 200, then a fuel efficiency of the vehicle 200 is improved. As the generator 25 driven by regenerative braking improves the fuel efficiency, the vehicle power supply device of this embodiment can be installed in the vehicle 200 without the idle stop function. The power supply device shown in FIG. 1 comprises a first battery 1, a second battery 2, a connecting switch 4, and a controlling circuit 5. The first battery 1 is connected to the generator 25 of the vehicle 200, a vehicle load 21, and a starter motor 22. The starter motor 22 is connected to the first battery 1 via a starter relay 23. The second battery 2 is different from the first battery 1 in the electric characteristics. The connecting switch 4 is connected between the first battery 1 and the second battery 2. The control circuit 5 carries out ON-OFF control of the connecting switch 4.

The generator 25 is able to charge the first battery 1 and the second battery 2 by regenerative braking. The generator 25 is driven by a vehicle kinetic energy by the reduced speed as the regenerative braking. At the time of the regenerative braking, wheels (not shown in figures) are coupled to the generator 25, so the wheels drive the generator 25. At this time, an excitation current of a rotor coil 37 of the generator 25 are controlled, and an output voltage of the generator 25 is adjusted, thus the first battery 1 and the second battery 2 are charged. When the excitation current is large, the output voltage of the generator 25 becomes high, then its braking force becomes big. Therefore, the excitation current of the rotor coil 37 is controlled at the optimal value by the braking force required by the vehicle and the output voltage of the generator 25. When only the generated power by regenerative braking cannot charge the first battery and the second battery to the predetermined capacity, namely, the remaining capacities and the voltage are lower than the predetermined value, an engine 31 drives the generator 25, and the first battery 1 and the second battery 2 are charged.

Vehicle load 21 is electric devices, for example, such as, lights, a wiper, an air-conditioner, an heater for demister of window glass, a car audio, or a car navigation. The starter motor 22 is connected to the first battery 1 via the starter relay 23. The starter relay 23 is turned on when an ignition switch 32 of the main switch in the vehicle is turned on. In the vehicle with the idle stop function, the starter relay 23 is turned on based on a signal from the vehicle side when the vehicle which stopped at the traffic light or the like starts, then the engine 31 starts.

The connecting switch 4 is a relay. Instead of the relay, as the connecting switch 4, a semiconductor switching element of a FET, a transistor, or the like is available. In the ON state of the connecting switch 4, the first battery 1 and the second battery 2 are connected in parallel. In this state, both of the first battery 1 and the second battery 2 provide electric power to the vehicle load 21. Further, in this state, the generator 25 charges both of the first battery 1 and the second battery 2 by regenerative braking. In the power supply device shown in FIG. 1, in the normal state, the connecting switch 4 is held in the ON state. However, only in the open condition, the connecting switch 4 is turned off including being held in the OFF state of the connecting switch 4.

In the OFF state of the connecting switch 4, the second battery 2 is not connected to the first battery 1. In this state, the generator 25 charges only the first battery 1. Further, in this state, only the first battery 1 provides power to the starter motor 22 and the vehicle load 21. In the OFF state of the connecting switch 4, the second battery 2 provides no electric power to the starter motor 22 and the vehicle load 21, and the second battery 2 is not charged by the generator 25.

The first battery 1 is a lead battery with the rated voltage of 12 V. But as the first battery 1, all of the batteries which have larger discharge current characteristics than the second battery 2, for example, a lithium ion battery or the like are available. Therefore, the first battery 1 provides electric power to the starter motor 22. In the lead battery for vehicles as the first battery 1, the rated voltage is 12 V. However, plural lead batteries are connected in series, then the rated voltage can be 24 V to 48 V. By using the high rated voltage of the first battery 1, a charging current by regenerative braking becomes small, then charging can be effectively done by regenerative braking. In the power supply device with the rated voltage of 24 V to 28 V, it is necessary to reduce the voltage of the first battery 1 by a DC/DC converter and provide electric power to the vehicle load.

The first battery 1 is charged by the generator 25 of which the voltage is controlled by a voltage adjusting circuit 26. When the first battery 1 with the rated voltage of 12 V is charged, the voltage adjusting circuit 26 controls the output voltage of the generator 25 into, preferably, 13.5 V to 14.5 V, such that the maximum voltage does not exceed 15 V. The output voltage of the generator 25 is controlled by the voltage adjusting circuit 26 such that the lead battery as the first battery 1 is charged in the appropriate voltage range. By making the output voltage of the generator 25 higher, namely, making the charging voltage of the first battery 1 higher, the voltage adjusting circuit 26 can enhance the charging capacity of the first battery 1 and the second battery 2. However, when the output voltage of the generator 25 is too high, the first battery 1 and the second battery 2 tend to be over charged, then it makes the life of them short. In contrast, when the output voltage of the generator 25 is low, while decreasing the charging capacity, the first battery 1 and the second battery 2 tend to be over discharged, then it makes the life of them short. Accordingly, the output voltage of the generator 25 is controlled by the voltage adjusting circuit 26 into the above voltage range so as to enhance the charging capacity of the first battery 1 and the second battery 2 and prevent over discharge.

The voltage adjusting circuit 26 controls the excitation current of the rotor coil 37 of the generator 25, and adjusts or controls the output voltage of the generator 25. The voltage adjusting circuit 26 is controlled by the controlling circuit 5. The controlling circuit 5 increases the excitation current of the rotor coil 37, and increases the output voltage of the generator 25. Further, the controlling circuit 5 decreases the excitation current of the rotor coil 37, and decreases the output voltage of the generator 25.

The second battery 2 is different from the first battery 1 in the electric characteristics, and has the higher energy density than the first battery 1, namely, and is a battery of the high energy density. The battery of the high energy density is a nickel hydride battery. The nickel hydride battery has the rated voltage of 1.2 V/Cell. Therefore, by connecting 10 cells of the nickel hydride battery in series, the rated voltage is 12 V, so the lead battery of the first battery 1 with the rated voltage of 12 V can be connected to the above nickel hydride battery in parallel. However, in this embodiment, the second battery of the high energy density is not limited to the nickel hydride battery. Instead of the nickel hydride battery, as the second battery of the high energy density, a lithium ion battery, a lithium polymer battery or the like of a non-aqueous electrolyle battery is available. Additionally, by using the second battery having a lower internal resistance than the first battery, being compared with only the first battery, the batteries are efficiently charged by regenerative braking.

The control circuit 5 comprises an actuating circuit 10, a first detecting circuit 11, a computing circuit 13, a second detecting circuit 12, a communicating circuit 14, and a power source circuit 15. The actuating circuit 10 turns on or off the connecting switch 5. The first detecting circuit 11 comprises an ASIC to detect a voltage, a current, and a temperature of the second battery 2. The computing circuit 13 turns on or off the connecting switch 15 via the actuating circuit 10 based on signals inputted from the first detecting circuit 11. The second detecting circuit 12 detects signals of the ignition switch 32 in the vehicle side. The communicating circuit 14 is communicated to a vehicle control portion 27 installed in the vehicle side. The power source circuit 15 provides electric power for to these circuits or the like.

In the case of using a relay as the connecting switch 4, the actuating circuit 10 turns on or off the connecting switch 4 by controlling the passage of electric current in the exciting coil of the relay. In addition, in the case of using a semiconductor switching element as the connecting switch 4, the actuating circuit 10 outputs control signals to the connecting switch 4 to carry out ON-OFF control of the semiconductor switching element.

The first detecting circuit 11 detects the voltage, the charging and discharging current, and the temperature of the second battery 2 in a predetermined sampling period, for example, 10 microseconds to 100 milliseconds, and converts the detected signal to the digital signal, then outputs it to the computing circuit 13. When in the vehicle side the voltage signal is detected, and the detected voltage signal is transmitted to the computing circuit 13, the first detecting circuit 11 need not detect the voltage of the first battery 1. But, the first detecting circuit can detect the voltage of the first battery. This first detecting circuit detects the voltage of the first battery by detecting the vehicle side voltage of the connecting switch.

The second detecting circuit 12 detects signals from the ignition switch 32 of the main switch in the vehicle side. The second detecting circuit 12 detects the ON state of the vehicle driving in turning on the ignition switch 32, and the signal to start the starter motor 22.

The computing circuit 13 carries out ON-OFF control of the connecting switch 4 via the actuating circuit 10 based on the signals inputted from the first detecting circuit 11 and the second detecting circuit 12. In the normal state, the computing circuit 13 always controls the connecting switch 4 in the ON state, namely, in the normal ON state. The computing circuit 13 always controls the connecting switch 4 in the ON state, namely, in the normal ON state. The computing circuit 13 turns off the connecting switch 4 only in the case of detecting the open condition, and always holds the connecting switch 4 in the ON state as long as the open condition is not detected. The computing circuit 13 holds the connecting switch 4 in the ON state as much as possible, and connects the second battery 2 and the first battery 1 in parallel in order to decrease the voltage difference between the first battery 1 and the second battery 2 as much as possible.

Here, the open condition detected by the computing circuit 13 includes the following states.
(1) The state in which electric power is provided to the starter motor 22.
(2) The abnormal state in which the first battery 1 and/or the second battery 2 is abnormal.

The state of (1) is a state in which the ignition switch is turned on, then the starter motor 22 is started.

The state of (2) is the following states of (a) to (f).
(a) The voltage difference between the first battery 1 and the second battery 2 is equal to or more than the predetermined value.
(b) The voltage of the first battery 1 is out of the normal range.
(c) The remaining capacity of the second battery 2 is more than the predetermined maximum remaining capacity, and the generator is in the generating state.
(d) The remaining capacity of the second battery 2 is less than the predetermined minimum remaining capacity, and the generator is in the non-generating state.
(e) The voltage of the second battery 2 decreases to the minimum voltage, and the generator 25 is in the non-generating state.
(f) The temperature of the secondary battery 2 is more than the maximum temperature, or less than the minimum temperature.

The open condition includes a state in which electric power is provided to the starter motor 22. The starter motor 22 consumes a very large current, for example, 100 A to 300 A, compared with the vehicle load 21. The lead battery which has the characteristics providing such a current to the starter motor 22 is used as the first battery 1. In order to protect a degradation of the second battery 2 by the large current of the starter motor 22, the second battery 2 does not provide electric power to the starter motor 22. The state of starting the starter motor 22 is inputted from the second detecting circuit 12. The computing circuit 13 detects the timing of starting the starter motor 22 based on the signal inputted from the second detecting circuit 12. And the state of starting the starter motor 22, namely, the state of turning on the starter relay 23 is regarded as the open condition, then the computing circuit 13 turns off the connecting switch 4, and hold the connecting switch 4 in the OFF state temporarily. Once the engine 31 starts, electric power is not provided to the starter motor 22.

In the OFF state of the connecting switch 4, the computing circuit 13 detects the voltage difference between the first battery 1 and the second battery 2. The computing circuit 13 comprises a voltage difference detecting portion 16 in order to detect the voltage difference between the first battery 1 and the second battery 2. The voltage difference detecting portion 16 detects the difference in the voltage between the voltage of the first battery 1 and the voltage of the second battery 2. The voltage of the first battery 1 is inputted via the communicating circuit 14 from the vehicle side, or detected by the first detecting circuit 11. The voltage of the second battery 2 is detected by the first detecting circuit 11. When the voltage difference between the first battery 1 and the second battery 2 detected by the voltage difference detecting portion 16 is less than the predetermined value, the computing circuit 13 changes from the OFF state of the connecting switch 4 to the ON state of it. When the cutoff of the current in the starter motor 22 is detected by the computing circuit 13 based on the signal inputted from the second detecting circuit 12, and the voltage difference between the first battery 1 and the second battery 2 detected by the voltage difference detecting portion 16 is less than the predetermined value, the computing circuit 13 changes from the OFF state of the connecting switch 4 to the ON state of it.

The OFF time of the connecting switch 4 at the time of starting the starter motor 22 is generally very short, for example, approximately several seconds. Therefore, after the time of starting the starter motor 22, the voltage difference between the first battery 1 and the second battery 2 detected by the voltage difference detecting portion 16 is small. Accordingly, after starting the engine 31 in the normal usage state of the engine, the computing circuit 13 changes from the OFF state of the connecting switch 4 to the ON state of it. But, when the time duration of starting the starter motor 22 becomes long, and the voltage difference between the first battery 1 and the second battery 2 becomes more than the predetermined value, the voltage difference detected by the voltage difference detecting portion 16 becomes more than the predetermined value. Under this state, regarding as the open condition, the computing circuit 13 holds the connecting switch 4 in the OFF state. In the OFF state of the connecting switch 4, the generator 25 charges only the first battery 1. As the first battery 1 is charged, the voltage of the first battery 1 increases. When by increasing the voltage of the first battery 1 the voltage difference between the first battery 1 and the second battery 2 detected by the voltage difference detecting portion 16 becomes less than the predetermined value, the computing circuit 13 changes from the OFF state of the connecting switch 4 to the ON state of it.

The computing circuit 13 of the control circuit 5 determines the open condition based on the state in which the voltage of the first battery 1 is out of the normal range, in addition to the starting state of the starter motor 22. This computing circuit 13 compares the voltage of the first battery 1 inputted via the communicating circuit 14 from the vehicle side. And when the voltage of the first battery 1 is lower than the minimum voltage in the normal range, or higher than the maxim voltage in the normal range, regarding as the open condition, the computing circuit 13 holds the connecting switch 4 in the OFF state. This computing circuit 13 stores the minimum voltage and the maxim voltage of the normal range in a memory (not shown in figures). When the lead battery with the rated voltage of 12V is used as the first battery 1, the minimum voltage in the normal range is, for example, 6V, and the maxim voltage in the normal range is, for example, 15V. Namely, when the computing circuit 13 detects that the voltage of the first battery 1 is less than 6V, or more than 15V, regarding as the open condition, the computing circuit 13 holds the connecting switch 4 in the OFF state. Moreover, the voltage of the first battery can be detected by the first detecting circuit.

The computing circuit 13 of the control circuit 5 determines the open condition based on the remaining capacity of the second battery 2. This computing circuit 13 comprises a remaining capacity detecting portion 17, and a power generation determining portion 18. The remaining capacity detecting portion 17 detects the remaining capacity of the second battery 2. The power generation determining portion 18 determined the generating state or the non-generating state in the vehicle side.

The remaining capacity detecting portion 17 calculates the remaining capacity (%), computing the current inputted from the first detecting circuit 11. Namely, the remaining capacity detecting portion 17 calculates the varying remaining capacity (Ah) by adding the integrated value of charging current to the latest remaining capacity or by subtracting the integrated value of discharging current from the latest remaining capacity (Ah), and computes the remaining capacity (%) from the ratio of the computed remaining capacity (Ah) to the full charge capacity (Ah). In addition, the remaining capacity detecting portion 17 can compensate the charge efficiency by using the temperature of the second battery 2 detected by the first detecting circuit 11, and more accurately computes the remaining capacity (%).

The power generation determining portion 18 determines the generating state or the non-generating state of the generator 25 by the signal from the vehicle control portion 27 via the communicating circuit 14. The vehicle control portion 27 outputs a generating signal in the generating state in which the generator 25 is driven by regenerative braking or by the engine 31, and a non-generating signal in the non-generating state, and those signals are inputted to the computing circuit 13 via the communicating circuit 14. But, as the voltage of the first battery 1 varies in the generating state or the non-generating state of the generator 25, the power generation determining portion 18 can determine the generating state or the non-generating state from the voltage of the first battery 1 without using the inputted signal from the vehicle side. The voltage of the first battery 1 in the generating state of the generator 25 is set by the voltage adjusting circuit 26 of the generator 25. The voltage adjusting circuit 26 of the generator 25 charging the lead battery 1 with the rated voltage of 12 V controls the output voltage of the generator 25 into 13.5 V to 14.5 V. Therefore, the voltage of the first battery 1 becomes 13.5 V to 14.5 V in the generating state. The voltage of the first battery 1 decreases into 12 V to 13 V in the non-generating state. Accordingly, the power generation determining portion 18 can determine the generating state by the condition in which the voltage of the second battery 2 is higher than 13V, and the non-generating state by the condition in which the voltage of the second battery 2 is lower than 13V.

When the remaining capacity detected by the remaining capacity detecting portion 17 is higher than the predetermined maximum remaining capacity, and the power generation determining portion 18 detects the generating state, the above computing circuit 13 changes to the OFF state of the connecting switch 4, regarding as the open condition. Namely, when the remaining capacity (%) of the second battery rises at the predetermined maximum remaining capacity, the computing circuit 13 holds the connecting switch 4 in the OFF state in the generating state, and the connecting switch 4 in the ON state in the non-generating state. Therefore, it prohibits charging, and enables discharging. The predetermined maximum remaining capacity is set at, for example, 80% to 100%, preferably 85% to 95%. As the computing circuit 13 stops charging in the generating state, and allows discharging with the remaining capacity of the second battery 2 more than the predetermined maximum remaining capacity, the second battery 2 which rose to the predetermined maximum remaining capacity does not rise to more than the predetermined maximum remaining capacity, and is not over charged.

Further, when the remaining capacity detected by the remaining capacity detecting portion 17 is lower than the predetermined minimum remaining capacity, and the power generation determining portion 18 detects the non-generating state, the computing circuit 13 changes to the OFF state of the connecting switch 4, regarding as the open condition. Namely, when the remaining capacity (%) of the second battery decreases at the predetermined minimum remaining capacity, the computing circuit 13 holds the connecting switch 4 in the ON state in the generating state for charging, and the connecting switch 4 in the OFF state in the non-generating state for prohibiting discharging. As the computing circuit 13 allows charging in the generating state, and prohibits discharging with the remaining capacity of the second battery 2 less than the predetermined minimum remaining capacity, the second battery 2 which was discharged to the predetermined minimum remaining capacity does not decrease to less than the predetermined minimum remaining capacity, and is not over discharged. The predetermined minimum remaining capacity is set at, for example, 0% to 20%, preferably 5% to 10%. The predetermined maximum remaining capacity and the predetermined minimum remaining capacity is stored in the memory (not shown in figures).

Further, when the voltage of the second battery 2 detected by the first detecting circuit 11 is lower than the predetermined minimum voltage and the power generation determining portion 18 detects the non-generating state, that is, the generator 25 is in the non-generating state, the computing circuit 13 changes to the OFF state of the connecting switch 4, regarding as the open condition. Even though the voltage of the second battery 2 decreases to less than the predetermined minimum voltage, when the generator 25 is in the generating state, not regarding as the open condition, the computing circuit 13 holds the connecting switch 4 in the ON state for charging by the generator 25. The predetermined minimum voltage of the second battery 2 is set at, for example, 80% of the rated voltage.

In the power supply device with the second battery of the nickel hydride battery, when the voltage of the second battery 2 decreases in the non-generating state, the computing circuit 13 changes to the OFF state of the connecting switch 4, regarding as the open condition. However when the voltage of the second battery 2 increases, the computing circuit 13 always holds the connecting switch 4 in the ON state without determining the open condition, because the voltage of the second battery 2 is not over charged through the output voltage of the generator 25 controlled by voltage adjusting circuit 26.

Moreover, when the temperature of the second battery 2 detected by the first detecting circuit 11 is higher than the maximum temperature, or lower than the minimum temperature, the computing circuit 13 can change to the OFF state of the connecting switch 4, regarding as the open condition. This computing circuit 13 stores the maximum temperature and the minimum temperature determined as the open condition in the memory (not shown in figures). The minimum temperature is, for example, −20 degree C. to −30 degree C., and the maximum temperature is, for example, 70 degree C. to 80 degree C. Accordingly the battery is protected through limiting charging and discharging in the low temperature state, and protected assuring the safety through limiting charging and discharging in the high temperature state.

In the above power supply device, only at the time of the control circuit 5 detecting the open condition, the control circuit 5 changes to the OFF state of the connecting switch 4. Therefore the second battery 2 is being protected, and the decrease of the life of the connecting switch 4 is prevented by preventing a large rush current flowing through the connecting switch 4. At the time of the control circuit 5 not detecting the open condition, the control circuit 5 holds the connecting switch 4 in the normal ON state, then the first battery 1 and the second battery 2 connected in parallel are efficiently charged by electric power of the generator 25.

Further the power supply device shown in FIG. 1 comprises an equalizing circuit 40 connected to the connecting switch 4 in parallel. The equalizing circuit 40 has a series circuit of a current limiting resistance 41 and an equalizing switch 42. The equalizing switch 42 of the equalizing circuit 40 is controlled by the control circuit 5. The control circuit 5 detects the voltage difference between the first battery 1 and the second battery 2 when the control circuit 5 changes from the OFF state of the connecting switch 4 to the ON state of it. Then when the voltage difference is more than the predetermined value, the control circuit 5 turns on the equalizing switch 42. And after equalizing the voltage difference between the first battery 1 and the second battery 2, the control circuit 5 changes from the OFF state of the connecting switch 4 to the ON state of it. As the first battery 1 and the second battery 2 is equalized, a equalizing current becomes small. Therefore when a current between the first battery 1 and the second battery 2 in the equalizing state, namely, the equalizing current becomes less than the predetermined value, regarding as the completion of equalizing, the control circuit 5 changes to the ON state of the connecting switch 4.

The equalizing current between the first battery 1 and the second battery 2 is specified by resistance value of the current limiting resistance 41 and the voltage difference. The equalizing circuit 40 can quickly complete the equalizing, by making the equalizing current large through decreasing resistance value of the current limiting resistance 41. The resistance value of the current limiting resistance 41 is set so as to quickly complete the equalizing between the first battery 1 and the second battery 2, such that the equalizing current is larger than the current of the vehicle load 21 until the completion of equalizing.

When the voltage difference between the first battery 1 and the second battery 2 is big in the OFF state of the connecting switch 4, the equalizing circuit 40 can reduce the rush current at the time of changing to the ON state of the connecting switch 4. However, in the embodiment, as the OFF state of the connecting switch 4 can be as short as possible by holding the connecting switch 4 in the normal ON state, and the voltage difference between the first battery 1 and the second battery 2 becomes small. Therefore, one embodiment does not necessarily need the equalizing circuit 40.

In addition, the power supply device shown in FIG. 1 comprises a fuse 43 connected to the second battery in series, and a disconnection detecting portion 44 detecting the disconnection of the fuse 43. The disconnection detecting portion 44 comprises a differential amplifier 45 detecting the voltage between both ends of the fuse 43, and the computing circuit 13 determining the disconnection of the fuse 43 based on the voltage detected by the differential amplifier 45. Comparing the detected voltage inputted from the differential amplifier 45 with the predetermined voltage stored in the memory (not shown in figures), when the detected voltage is higher than the predetermined voltage, the computing circuit 13 determines the disconnection of the fuse 43 in the following reason. By the disconnection of the fuse 43, the first battery 1 and the second battery 2 are not connected, and one input terminal of the differential amplifier 45 is connected to the first battery 1, the other input terminal is connected to the second battery 2. By the disconnection of the fuse 43, only the first battery 1 which is not connected to the second battery 2 is charged by the generator 25, and discharged to the vehicle load 21. Therefore, by the disconnection of the fuse 43, the voltage difference between the first battery 1 and the second battery 2 occurs. By detecting that the voltage difference between the first battery 1 and the second battery 2 is more than the predetermined voltage, the disconnection of the fuse 43 is determined. Once the fuse 43 is disconnected, regardless of the ON state or the OFF state of the connecting switch 4, the voltage difference between both ends of the fuse 43 occurs. Therefore, the above disconnection detecting portion 44 can detect the disconnection of the fuse 43.

Moreover the power supply device shown in FIG. 1 comprises a melt determining portion 46 detecting the connecting switch 4 being melted and joined together. The melt determining portion 46 comprises a differential amplifier 47 detecting the voltage between both ends of the connecting switch 4, and the computing circuit 13 determining the state being melted and joined together (hereinafter described as the melted state) of the connecting switch 4. For example, the connecting switch 4 is the relay, and in the melted state contacts of the connecting switch 4 are melted and joined together. Comparing the detected voltage inputted from the differential amplifier 47 with the predetermined voltage stored in the memory (not shown in figures), when the detected voltage is lower than the predetermined voltage, the computing circuit 13 determines the melted state of the connecting switch 4 in the following reason. In the melted state of the connecting switch 4, the voltage between both ends of the connecting switch 4 becomes approximately 0V. In the contrast, in the normal state (no melted state) of the connecting switch 4, the voltage between both ends of the connecting switch 4 is the voltage difference between the first battery 1 and the second battery 2. Therefore, by detecting that the voltage between both ends of the connecting switch 4 is less than the predetermined voltage, the melt determining portion 46 can detect the melted state of the connecting switch 4.

INDUSTRIAL APPLICABILITY

A vehicle power supply device according to the present invention can be suitably used as power supply devices which provide electric power to the starter motor and the vehicle load installed in the vehicle.

The invention claimed is:

1. A vehicle power supply device comprising:
a first battery being connectable to a starter motor, a vehicle load, and a generator;
a second battery being different from the first battery in electric characteristics;
a connecting switch being connected between the first battery and the second battery, and connecting the second battery to the first battery in parallel in an ON state of the connecting switch; and
a control circuit controlling the connecting switch,
wherein in the ON state of the connecting switch, the generator charges the first battery and the second battery,
wherein the control circuit controls to change to an OFF state of the connecting switch in a state of providing electric power to the starter motor, or in a state of detecting an open condition including an abnormal state of the first battery and/or the second battery, and to hold the connecting switch in the ON state in a normal state in which the open condition is not detected,
wherein the control circuit comprises a remaining capacity detecting portion detecting a remaining capacity of the second battery, and a power generation determining portion determining a generating state or a non-generating state in a vehicle side, and
wherein when the remaining capacity detected in the remaining capacity detecting portion is more than a maximum remaining capacity and the power generation determining portion determines that the vehicle side is in the generating state, or when the remaining capacity detected in the remaining capacity detecting portion is less than a minimum remaining capacity and the power generation determining portion determines that the vehicle side is in the non-generating state, the control circuit holds the connecting switch in the OFF state, regarded as the open condition.

2. The vehicle power supply device according to claim 1, wherein the control circuit comprises a voltage difference detecting portion to detect a voltage difference between the first battery and the second battery, and
wherein in the OFF state of the connecting switch, when the voltage difference detecting portion detects the voltage difference more than a predetermined value, regarded as the open condition, the control circuit holds the connecting switch in the OFF state.

3. The vehicle power supply device according to claim 1, wherein the control circuit comprises a communicating circuit connectable to the vehicle side,
wherein when a voltage of the first battery inputted from the vehicle side via the communicating circuit is out of a normal range, regarded as the open condition, the control circuit changes to the OFF state of the connecting switch.

4. The vehicle power supply device according to claim 1, further comprising a fuse connected to the second battery in series, and a disconnection detecting portion detecting a disconnection of the fuse,
wherein the disconnection detecting portion determines the disconnection by detecting a voltage between both ends of the fuse.

5. The vehicle power supply device according to claim 1, further comprising a melt determining portion determining if contacts of the connecting switch are melted and joined together,
wherein the melt determining portion determines the contacts being melted and joined together by detecting a voltage between both ends of the connecting switch.

6. The vehicle power supply device according to claim 1, wherein the first battery is a lead battery, and the second battery has a higher energy density than the first battery.

7. The vehicle power supply device according to claim 6, wherein the second battery having the high energy density is at least one of a nickel hydride battery, a lithium ion battery, or a lithium polymer battery.

8. The vehicle power supply device according to claim 1, further comprising an equalizing circuit being connected to the connecting switch in parallel,
wherein the equalizing circuit comprises a series circuit of a current limiting resistance and an equalizing switch, and
wherein in the OFF state of the connecting switch, the control circuit equalizes voltages of the first battery and the second battery by controlling the equalizing switch of the equalizing circuit.

9. A vehicle equipped with a power supply device, the power supply device comprising:
a first battery being connectable to a starter motor, a vehicle load, and a generator;
a second battery being different from the first battery in electric characteristics;
a connecting switch being connected between the first battery and the second battery, and connecting the second battery to the first battery in parallel in an ON state of the connecting switch; and
a control circuit controlling the connecting switch,
wherein in the ON state of the connecting switch, the generator charges the first battery and the second battery,
wherein the control circuit controls to change to an OFF state of the connecting switch in a state of providing electric power to the starter motor, or in a state of detecting an open condition including an abnormal state of the first battery and/or the second battery, and to hold the connecting switch in the ON state in a normal state in which the open condition is not detected,
wherein the control circuit comprises a remaining capacity detecting portion detecting a remaining capacity of the second battery, and a power generation determining portion determining a generating state or a non-generating state in a vehicle side, and
wherein when the remaining capacity detected in the remaining capacity detecting portion is more than a maximum remaining capacity and the power generation determining portion determines that the vehicle side is in the generating state, or when the remaining capacity detected in the remaining capacity detecting portion is less than a minimum remaining capacity and the power generation determining portion determines that the vehicle side is in the non-generating state, the control circuit holds the connecting switch in the OFF state, regarded as the open condition.

* * * * *